UNITED STATES PATENT OFFICE.

JAMES HOWARD YOUNG, OF PITTSBURGH, PENNSYLVANIA, ASSIGNOR TO H. H. ROBERTSON COMPANY, OF PITTSBURGH, PENNSYLVANIA, A CORPORATION OF PENNSYLVANIA.

PAINT.

1,410,790.        Specification of Letters Patent.     Patented Mar. 28, 1922.

No Drawing.     Application filed April 16, 1920. Serial No. 374,385.

*To all whom it may concern:*

Be it known that I, JAMES HOWARD YOUNG, a citizen of the United States, residing in Pittsburgh, in the county of Allegheny and State of Pennsylvania, have invented an Improvement in Paint, of which the following is a specification.

This invention relates to paints and particularly to light colored paints which are capable of being used to cover asphaltic or like hydrocarbonaceous surfaces without being discolored or substantially discolored by the hydrocarbonaceous material of said surfaces.

Prior to this invention, attempts have been made to provide asphaltic or like hydrocarbonaceous surfaces with a light colored film or layer, by applying thereto an ordinary oil paint, but such attempts have not to my knowledge been successful owing to the fact that the vehicle of the paint, such as linseed or other oil, has a solvent action on the asphalt or like black hydrocarbonaceous material, which discolors the light colored paint and defeats the object sought.

The present invention has for its object to provide a paint and especially a light colored paint, such as a white, French gray, light green or the like, which can be applied to tar, pitch, asphaltic, bituminous or like hydrocarbonaceous black surfaces without being discolored or substantially discolored, and which possesses certain other desirable properties as will be described.

To this end, the paint is composed of a soluble base, a solvent for said base, a pigment or color, and a diluent or thinner for the solution of the base in said solvent, which diluent is of such a nature that it has very little if any solvent action on the asphaltic or like black surface, and which is present in sufficient quantity to render the solvent non-active or substantially so on the asphalt or like hydrocarbonaceous material without materially affecting the solution of the base in its solvent.

The soluble base of the paint may and preferably will be a cellulose derivative, such as cellulose nitrate or cellulose acetate, and as the solvent therefor acetone, but instead of the latter any other of the well known solvents for cellulose nitrates or acetates may be used, such as amyl acetate, ethyl and methyl acetates or ketones for the nitrates and alcohol-chloroform or carbon tetrachloride for the acetates. As a diluent which is non-active or substantially so upon the asphalt or like material, it is preferred to use an alcohol, preferably ethyl or methyl alcohol.

In order that the invention may be clearly comprehended, one set of ingredients and proportions with which excellent results have been obtained will be enumerated, but it is to be understood that it is not desired to limit the invention to the particular ingredients and proportions recited.

Cellulose nitrate or products containing essentially cellulose nitrate, such as some photographic films, celluloid, etc., is dissolved in acetone in a manner well known, and to this solution is then added enough ethyl alcohol to produce a solution of the following proportions, to wit: 10 parts by weight cellulose nitrate, 25 parts by weight acetone, 70 parts by weight ethyl alcohol, 5 parts by weight castor oil.

To this is then added 10 parts by weight of aluminum resinate and the whole is stirred until the resinate is dissolved. To this solution is then added 10 parts by weight of powdered aluminum and 5 parts by weight of green pigment, finely ground in alcohol. The whole is then thoroughly stirred together. By thinning this composition with a mixture of alcohol 70 parts and acetone 30 parts, it is possible to get a liquid of a consistency which may be brushed onto the asphaltic surface either mechanically or by hand, or it may be sprayed onto the surface or the asphaltic article may be dipped into it, the idea being to uniformly coat the asphaltic surface with the liquid described. Upon standing, the volatile part of the solution evaporates, leaving a tough uniform film over the asphaltic surface which is light green in color and which has not been darkened nor streaked by the constituents of the asphalt upon which the film was produced.

The film so produced consists essentially of the cellulose nitrate and pigments, but has in addition a filler (aluminum resinate) which gives body to the film and which aids in preventing the so-called "blushing" of the film during the evaporation of the solvents.

In the above formula it will be seen that the alcohol which is a non-solvent for the asphalt, is present in the composition or paint materially in excess of the solvent for the cellulose base, so as to render the said solvent inactive or passive on the asphalt, yet is not in such excess as to precipitate the cellulose from its solution.

The film or layer above described, not only provides the black asphalt or like material with a light colored attractive surface, which is not streaked or otherwise discolored by the black color of the asphalt, but also forms when the solvent has evaporated a tough and durable weather resisting surface which is not tacky and which prevents sticking.

Instead of the light green pigment or color, any other pigment or color suitable for giving a light color, such as white, French gray or the like can be used. So also any suitable pigment or color for giving a dark color, such as red, brown, etc., may be used when a dark color is desired and a clearer and better dark colored surface obtained.

The advantages of the invention are particularly noticeable when a light colored film or layer is desired.

When cellulose acetate is used as the base of the paint, the same principle of maintaining an adequate percentage of non-solvent for asphalt in the solution of the cellulose acetate during the evaporation of the solvents to produce a satisfactory film on asphalt or the like is observed.

The paint and especially the light colored paint is adapted among other uses to be employed on asphaltic or like surfaces of metal articles and particularly metal sheets, and also on any other article having thereon a layer of asphalt or the like, as the colored film formed by the evaporation of the volatile solvents is tough, firm and does not crack or alligator, is not sticky or tacky, is durable and weather-resisting, and can be painted with the ordinary drying oil paint, as the latter is prevented from being discolored by the asphalt.

It is to be understood that the physical properties of the cellulose base may be modified as desired by the addition to the cellulose solution of other materials, such as triphenylphosphate, to reduce the inflammability, and camphor, castor oil, etc., to increase the flexibility or otherwise modify the physical characteristics of the cellulose, so long as they are not used in sufficient quantity to cause the film to appreciably dissolve the underlying asphalt or become discolored by it.

So also, resins, such as soft copals, sandarac, shellac or metallic resinates soluble in alcohol, such as aluminium or zinc, may be added to the cellulose solution if desired.

I claim:

1. A paint for asphaltic or like hydrocarbonaceous surfaces having a cellulose derivative as a base, a solvent therefor, a color and an alcoholic diluent in excess of said solvent, said paint having substantially a non-solvent action upon asphalt or like hydrocarbonaceous materials.

2. A light colored paint having a cellulose base, a solvent therefor, a light color, and a diluent which is present in excess of the said solvent and is substantially a non-solvent for asphalt or like hydrocarbonaceous material.

3. A paint having a cellulose base, a solvent therefor, a color, and a diluent which is substantially a non-solvent for asphalt or like hydrocarbonaceous material and is present in excess of said solvent.

4. A paint for asphaltic or like hydrocarbonaceous surfaces, having a cellulose derivative base, a solvent therefor, a color, and a diluent which is substantially a non-solvent for the asphalt or like hydrocarbonaceous material and is present in sufficient quantity to render the paint substantially inactive as a solvent upon the asphaltic or like surface to which the paint is applied.

5. A paint for asphaltic or like hydrocarbonaceous surfaces having a cellulose derivative as a base, a solvent therefor, a color, and an alcoholic diluent present in sufficient quantity to render the paint substantially inactive as a solvent upon the asphaltic or like surface to which the paint is applied.

In testimony whereof, I have signed my name to this specification.

JAMES HOWARD YOUNG.